United States Patent [19]

Chang

[11] 4,424,069

[45] Jan. 3, 1984

[54] DRY AND WET DUAL-PURPOSE DUST-COLLECTING DEVICE

[76] Inventor: Shien-Fang Chang, 55 Chung Cheng Rd., Hsin Ying Chen, Tainan Hsien, Taiwan

[21] Appl. No.: 407,592

[22] Filed: Aug. 12, 1982

[51] Int. Cl.[3] .............................................. B01D 47/02
[52] U.S. Cl. ..................................... 55/226; 55/227; 55/229; 55/237; 55/239; 55/244; 55/256; 55/318; 55/344; 55/349; 55/417; 55/419; 55/472; 261/24; 261/56; 261/63; 261/79 A; 261/124
[58] Field of Search ................... 55/226, 227, 229, 237, 55/239, 244, 256, 318, 344, 349, 417, 419, 472; 261/79 A, 24, 56, 63, 124

[56] References Cited

U.S. PATENT DOCUMENTS

| | | | |
|---|---|---|---|
| 1,890,070 | 12/1932 | Whiton, Jr. ........................ | 55/344 X |
| 1,894,744 | 1/1933 | Hawley ............................. | 55/237 X |
| 2,075,344 | 3/1937 | Hawley ............................. | 261/79 A X |
| 2,209,339 | 7/1940 | Knight .............................. | 55/344 X |
| 2,539,992 | 1/1951 | Cover ............................... | 55/227 |
| 2,565,596 | 8/1951 | Cox .................................. | 55/239 |
| 3,331,194 | 7/1967 | Reed et al. ....................... | 261/79 A X |
| 3,406,498 | 10/1968 | Wisting ............................. | 55/227 |
| 3,738,627 | 6/1973 | Scotchmur ....................... | 55/226 X |
| 4,132,537 | 1/1979 | Bennett ............................ | 55/226 |
| 4,312,646 | 1/1982 | Fattinger et al. ................. | 55/227 X |

FOREIGN PATENT DOCUMENTS

| | | | |
|---|---|---|---|
| 600807 | 8/1934 | Fed. Rep. of Germany ... | 261/79 A |
| 649633 | 12/1928 | France ............................. | 55/237 |
| 866296 | 7/1941 | France ............................. | 55/226 |

*Primary Examiner*—Kathleen J. Prunner
*Attorney, Agent, or Firm*—Burns, Doane, Swecker & Mathis

[57] ABSTRACT

A dual purpose dust-collecting device consisting of an upright cylinder tapered at the lower end to form a settling chamber containing water. An inner cylinder formed with a plurality of circumferentially spaced tangential inlets is secured to the inside of the cylinder to define therewith an annular gas stream passage. A swinging inlet damper mounted in a manifold having an upper tangential gas outlet and a lower tangential gas outlet leading to the upper and lower ends of the cylinder respectively is employed for selectively admitting gas from the manifold inlet to the upper end of the cylinder or to the annular gas passage. When dirty gas enters the annular passage under the action of an exhaust fan mounted atop the cylinder, a whirling gas stream will be created therein and forced through the tangential inlets into the inner cylinder wherein a rapidly rotating whirlpool will be created which causes separation of particles from the dirty gas stream. When dirty gas is admitted to the upper end of the cylinder, the gas will be induced to spiral downward by an inverted cone depending from the top of the cylinder and cause the water in the cylinder to become a rising whirling water curtain whereby particles separated from the dirty gas stream by centrifugal force settle to the bottom of the settling chamber while the cleaned gas is discharged through the cone by the fan. The device may serve as a conventional dry cyclone dust collector if water is not used.

5 Claims, 4 Drawing Figures

DRY AND WET DUAL-PURPOSE DUST-COLLECTING DEVICE

The present invention relates to air-cleaning devices, and in particular to a dust-collecting device in which cyclone and/or vortex is selectively created to effectively separate and remove air pollutants such as soot, fly ash and toxic gases from gaseous waste released in industrial processes.

Known wet dust collectors which operate by passing and contacting a dirty gas stream with water which is sprayed and atomized have some drawbacks. Firstly, because full contact of the gas stream with the vapor cannot be achieved, the collecting effect is lessened. Secondly, since a spray manifold and a pump for supplying pressurized water thereto must be provided, this renders the dust collector costly and complex in construction. Thirdly, the wet dust collector cannot function as a dry-centrifugal collector if water supply is cut off.

Therefore, the invention is directed toward overcoming the aforesaid disadvantages by providing a high-efficiency dry and wet dual-purpose dust-collecting device which employs an exhaust fan to create cyclone or vortex great enough to separate and remove, without the use of any spraying or filtering devices, solid particles from flue gases and other waste gas streams to thereby prevent air pollution.

It is an object of the invention to provide a cyclone dust-collecting device which may operate as a dry-centrifugal collector or alternatively as a wet collector, thus better suited for use in various industries.

It is another object of the invention to provide a dust-collecting device which includes a swinging damper means for controlling a two-way gas inlet either to direct dirty gas into a settling chamber wherein it is mixed with water to create a whirlpool or to direct dirty gas into a centrifugal cyclone chamber to create cyclone which spirals downward to the settling chamber to thereby create a rising whirling water curtain such that particles are centrifuged out of the dirty gas, brought into full contact with and absorbed by the whirling flow to enable a completely cleaned gas stream to be discharged.

It is a further object of the invention to provide a dust-collecting device which does not incorporate any spraying means or movable parts therein so as to be simple in construction, inexpensive, and free from mechanical breakdowns.

It is still a further object of the invention to provide a dust-collecting device having a settling chamber wherein a predetermined level of water contained therein is constantly maintained either under calm conditions or in operation to facilitate creating a whilpool.

It is another object of the invention to provide a dust-collecting device to effectively separate and absorb soot, fly ash or noxious gas present in gaseous waste released in industrial processes by means of centrifugal force and a chemical solution, respectively.

These and other objects and features of the invention will become more apparent from the following description taken in connection with the accompanying drawings wherein.

Figure 1:
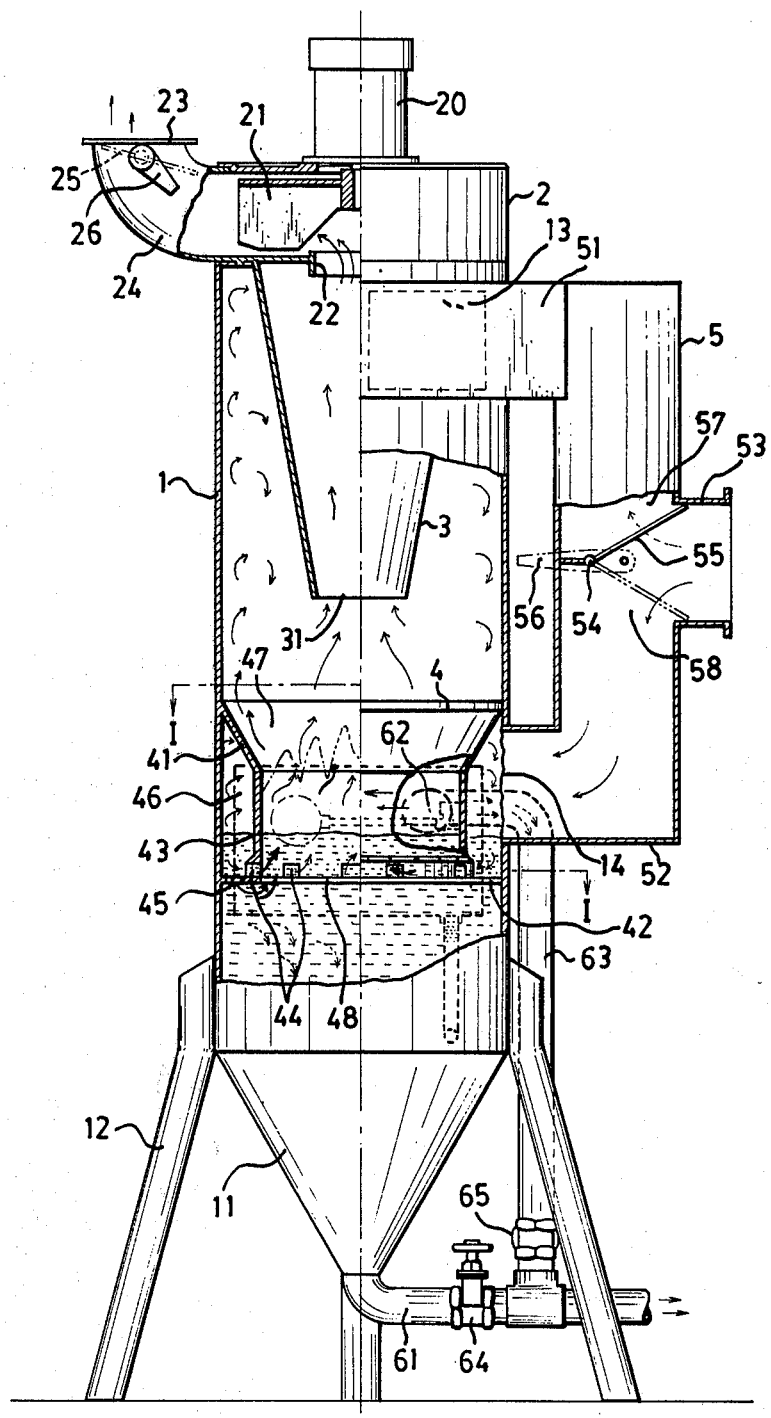
FIG. 1 is an elevation, partly in section, of a dry and wet dust-collecting device according to the invention.

With reference to FIG. 1, the dry and wet dust-collecting device according to the invention consists of a cylinder 1 supported in upright position by supporting legs 12, the cylinder being tapered at the lower end to form a funnelform settling chamber 11.

Figure 4:
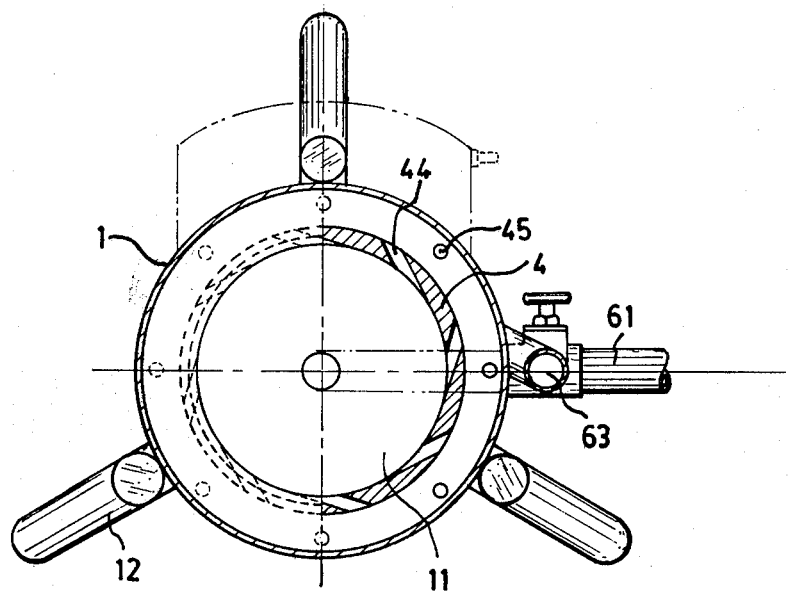
FIG. 4 is a sectional view taken along the line I—I of FIG. 1.

On the top of the cylinder 1 there is an upright exhaust fan 2 mounted in a cylindrical casing. The exhaust fan has vane blades 21 and is adapted to be driven by a motor 20 installed atop its casing. A vent 22 formed in the bottom surface of the casing is positioned centrally of the top end surface of, and opens into, the cylinder. An exhaust pipe 24 extends from the peripheral wall of the casing in a tangential direction and curves upward to form an exhaust port 23 wherein a flap valve 25 manipulatable by a lever 26 is provided for regulating cleaned gas to be discharged into the atmosphere. An inverted hollow cone 3 which at its small end has a gas inlet 31 opposite the vent 22 projects downward from the top end of the cylinder 1. Located below the cone 3 and approximately centrally of the cylinder is an inner cylinder 4 which has a cylindrical portion 43 and a wide, cone-shaped mouth 41 flaring upward from the cylindrical portion 43. An end flange 42 having a purality of water holes 45 is formed around the lower end of the inner cylinder 4. Equidistantly spaced apart around the lower peripheral wall of the cylindrical portion 43 are a plurality of tangential cyclone inlets 44 (see FIG. 4). The inner cylinder is held in position by welding the circular edge of the mouth 41 and the flange 42 to the inner wall of the cylinder 1, with the cylinder and inner container jointly defining therebetween an annular gas stream passage 46. The inner cylinder is open at both ends, the top opening 47 facing the gas inlet 31 at the small end of the cone 3 and the bottom opening 48 communicating with the settling chamber 11.

In its peripheral wall the cylinder 1 has an upper gas inlet port 13 and a lower gas inlet port 14 for the passage of dirty gas into the upper section of the cylinder and the annular gas stream passage 46, respectively. An upstanding manifold 5 has an upper tangential gas outlet 51 connected to the upper gas inlet 13 and a lower tangential gas outlet 52 connected to the lower gas inlet 14. The manifold further has a centrally located dirty gas inlet 53 facing away from the tangential gas outlets 51 and 52 and adapted to be connected with a chimney or flue (not shown). A swinging inlet damper 55 hinged on a shaft 54 is provided in the manifold for selectively opening or closing by a control lever 56 the entrance 57 to the upper tangential outlet 51 or the entrance 58 to the lower tangential outlet 52.

The settling chamber 11 is connected at the bottom with a drain 61 fitted with a drain valve 64 so as to carry off sludge accumulated in the settling chamber. An overflow 62 leading to an overflow pipe 63 fitted with a valve 65 is formed in the central peripheral wall of the inner cylinder 4. The overflow pipe 63 penetrates the wall of the cylinder 1, extends downward, and is joined to the drain 61.

Figure 2:
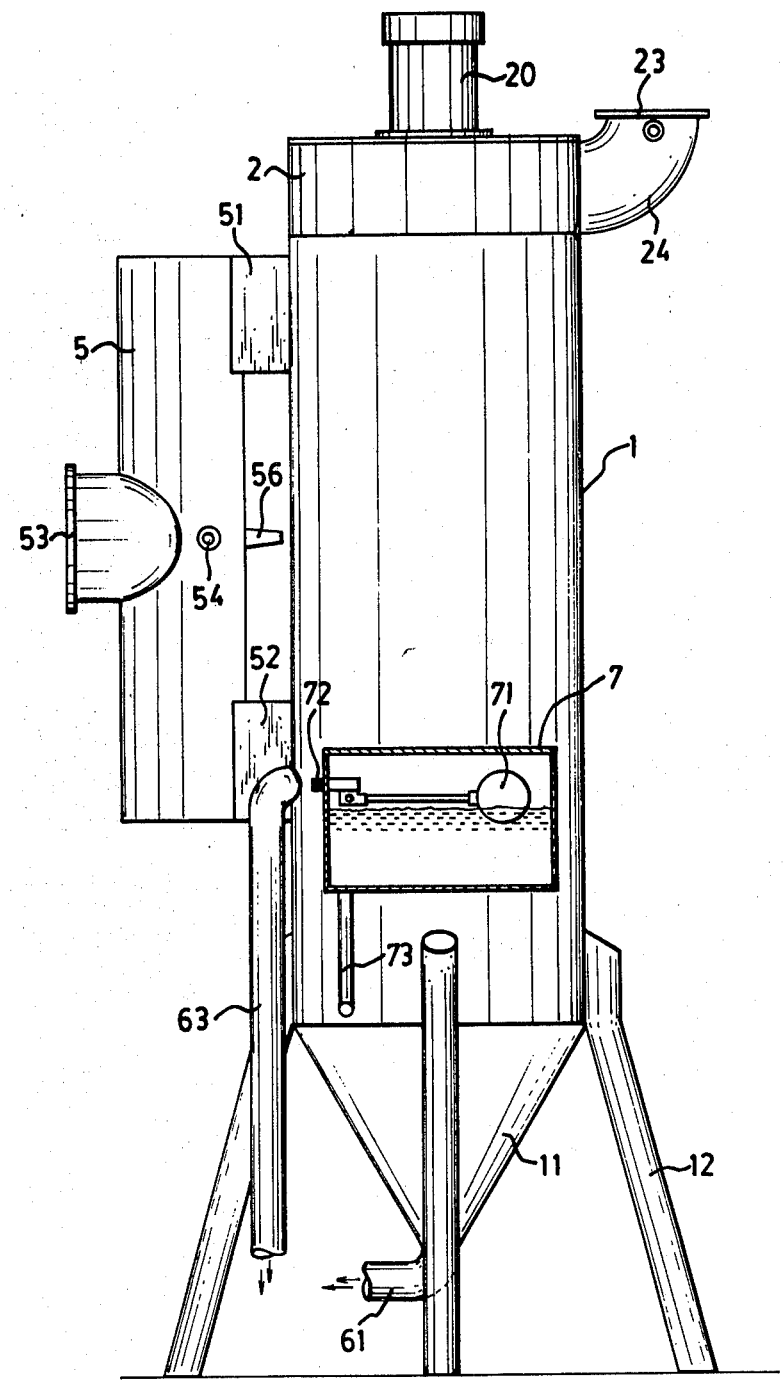
FIG. 2 is a rear view of the dry and wet dust-collecting device.
Figure 3:
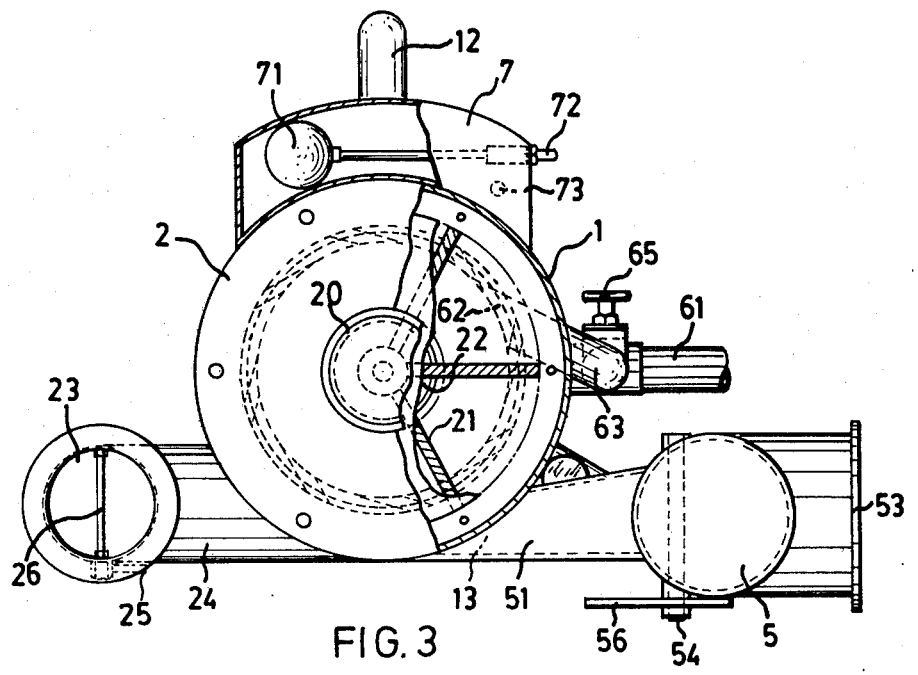
FIG. 3 is a top view, partly in section, of the dry and wet dust-collecting device.

A water tank 7 is attached to the outer wall of the cylinder 1 at a position approximately corresponding to that of the inner cylinder 4, as can be seen in FIGS. 2 and 3. The water tank is provided with a float 71 for controlling the level of water contained therein. A water inlet 72 connected to a source of water supply is provided at one side of the water tank and a water outlet 73 leading to the settling chamber is provided at the bottom. Thus, water is allowed to flow into the settling chamber with the float maintaining the water level between the tangential cyclone inlets 44 and the overflow 62.

In operating the dust-collecting device of the invention to handle, for example, waste products given off by factory chimneys, water is first supplied into the settling chamber until it rises to the level controlled by the float in the water tank. Then by operating the lever 56 so that the swinging inlet damper 55 pivots from the phantom line position shown in FIG. 1 to a position in which the entrance 57 is closed and the entrance 58 to the lower tangential gas outlet 52 is open, dust-laden gas can be admitted to the lower tangential gas outlet 52 through the dirty gas inlet 53 of the manifold and drawn into the annular gas stream passage 46 when the exhaust fan is activated. When the dust-laden gas enters the annular gas stream passage tangentially through the gas inlet port 14, a whirling motion of the gas stream, or cyclone, is created in the passage. Since there is no way out for the whirling gas stream in the sealed annular passage 46 while a continuous flow of dirty gas is admitted through the manifold, the whirling gas stream will be forced into the water in the cylinder and most will thrust tangentially into the inner cylinder through the tangential cyclone inlets 44 while a small amount thereof will find its way to the settling chamber through the water holes 45. When the whirling gas stream enters the inner cylinder tangentially, the initially still water in the inner cylinder will be so agitated as to produce a powerful, high-velocity vortex therein while a large amount of the water in the lower portion of the annular passage 46 is drawn into the inner cylinder under the influence of the exhaust fan. The vortex causes the water level in the inner cylinder to rise from the center or cavity to the overflow 62. With the gas stream in full contact with the bubbling, surging water in the powerful rapidly rotating vortex, soot, fly ash or particles under the action of centrifugal force and impact imposed by the vortex are effectively separated from the gas stream, dissolved and absorbed. Thereafter, heavier particles gradually settle to the conical bottom of the settling chamber while the lighter particles on the surface of the water are discharged with water running out through the overflow into the pipe 63 and drain 61. Meanwhile, the cleaned white gas stream moves out of the vortex in a cyclonic manner upward into the cone 3, and during the upward spiralling movement of the gas stream, fine liquid particles suspended in the gas stream are flung to the wall of the cone and then slide down to the inner cylinder, with the cleaned airflow being discharged by the exhaust fan through the exhaust port 23 into the atmosphere.

The drain 61 may preferably lead to a sediment basin (not shown) so that after the sludge settles out the settled water can be introduced back into the water inlet 72 for reuse.

As described heretofore, dust-laden gas is admitted to the lower section of the cylinder so as to be purified through the water therein. However, it can also be admitted to the upper section of the cylinder to serve the same purpose in that the swinging inlet damper 55 in the manifold can be shifted to a position in which the entrance 58 is closed and the entrance 57 is open to thereby permit the dirty gas stream to pass through.

More specifically, when the swinging inlet damper is shifted so that the entrance 57 is open, dust-laden gas can pass through the upper tangential outlet 51 and enters the upper section of the cylinder tangentially through the gas inlet port 13, where it rotates downward about the cone 3. When it reaches the inner cylinder, the downward spiralling gas stream causes the water in the inner cylinder to so rotate that a forceful whirling water curtain or whirlpool is created rising in conformity to the inner periphery of the cylinder. When it rises to the top of the cylinder, the whirling water curtain will be subjected to the impact of the continuously incoming tangential gas stream and thus dispersed there into sprinkling fine droplets, which are immediately mixed with the downward spiralling gas stream. During the downward journey of the gas stream, particles separated from the gas stream by centrifugal force are trapped in the droplets and water curtain, fall to the inner cylinder, and settle to the bottom of the settling chamber, while the cleaned gas is drawn up into the cone and discharged through the exhaust port 24.

In the above operation an amazing phenomenon is observed which makes possible complete removal of particles from the dirty gas stream. Since the gas stream results in a rising whirling water curtain which is dispersed at the top into aerosols, three layers of whirling flows are created in the cylinder, namely, an outer layer formed of the rising whirling water curtain, an intermediate layer of downward spiralling, misty gas-water flow, and an inner layer of upward spiralling cleaned airflow. The three layers of whirling flows effect full contact of the dirty gas with the water in the cylinder, and particles suspended in the dirty gas are thrown around by centrifugal force from the inner to the outer layer. The particles of lower specific gravity will be trapped in the intermediate misty layer and discharged through the overflow; the particles of higher specific gravity will be trapped in the outer layer and fall with droplets freed from centrifugal force into the settling chamber; and the lightest cleaned gas flow will reverse direction under the action of the exhaust fan, traveling spirally upward through the cone to the exhaust pipe.

In the embodiment described above, water is used as an absorbent in the settling chamber, this being particularly suitable for dealing with stack-gas effluents containing a large amount of soot or fly ash and/or water-soluble noxious gases such as $NH_3$, HF. In dealing with insoluble noxious gases such as $SO_2$, HCl, $Cl_2$, $H_2S$, however, such chemical solutions as NaOH should be used instead of water as an absorbent so that in addition to fly ash and soot, noxious gases can also be absorbed.

Alternatively, if neither water nor a chemical solution is used, the device of the invention may serve as a conventional dry cyclone dust collector with the same effect.

It is apparent from the foregoing that the invention not only is better suited for effective purification of gaseous waste released in industrial process in preventing a nuisance but may also be extensively used with various furnaces, in chemical factories, and in the metallurgic and foundry industries. Furthermore, the invention does not include any movable parts except for an exhaust fan. Therefore, it is simple in design and construction, free from mechanical breakdowns, low costing, and easy in maintenance.

While a preferred embodiment of the invention has been described in detail, it will be apparent to those skilled in the art that changes can be made in this embodiment without departing from the spirit of the invention. For example, mere adoption of the upper half or lower half construction of the cylinder or closing one of the gas inlet ports 13 and 14 and connecting a flue directly to the open gas inlet port is considered to be within the scope of the appended claims.

I claim:

1. A dry and wet dual-purpose dust-collecting device, comprising: an upright cylinder tapered at the lower end to form a funnelshaped settling chamber and formed in its peripheral wall with an upper gas inlet port and a lower gas inlet port; an inner cylinder having a flaring top, a lower end flange, an overflow formed in its peripheral wall, and a plurality of circumferentially spaced tangential cyclone inlets arranged in its peripheral wall spaced below said overflow, said inner cyliner being secured to the lower inside surface of said upright cylinder above said settling chamber such that an annular cyclone passage is defined therebetween; said lower gas inlet port being disposed in that portion of said upright cylinder defining said annular cyclone passage; an exhaust fan mounted in a casing atop said upright cylinder, said casing having an exhaust pipe extending tangentially therefrom and in its bottom surface a vent opening into a hollow cone projecting downward from the upper end of said cylinder and terminating above said inner cylinder; a manifold having a dirty gas inlet, a pair of parallel gas outlets arranged at opposite ends of the manifold and leading to the upper and lower gas inlet ports in said upright cylinder respectively, and a swinging inlet damper disposed adjacent said dirty gas inlet and pivotably mounted in the manifold to selectively prevent passage of dirty gas from the dirty gas inlet to one of said gas outlets; a water tank secured to the outside surface of said peripheral wall of said upright cylinder at a position approximately corresponding to said inner cylinder, said tank having a water inlet connected with a source of water supply, an outlet pipe leading to said settling chamber, and a water level control means therein disposed so as to maintain a water level in said inner cylinder between said cyclone inlets and said overflow; and a drain connected with the bottom of said settling chamber.

2. A dry and wet dual-purpose dust-collecting device according to claim 1, wherein said pair of gas outlets of the manifold are arranged in tangential relation to said gas inlet ports in the wall of said cylinder.

3. A dry and wet dual-purpose dust-collecting device according to claim 1, wherein said lower end flange of said inner cylinder is formed with a plurality of water holes.

4. A dry and wet dual-purpose dust-collecting device according to claim 1, wherein said overflow of said inner cylinder is arranged in tangential relation to the peripheral wall of said cylinder and leads to an overflow pipe joined to said drain.

5. A dry and wet dual-purpose dust-collecting device according to claim 1, wherein said exhaust pipe includes therein a flap valve for regulating cleaned gas to be discharged.

* * * * *